(12) United States Patent
Alexandre et al.

(10) Patent No.: US 8,553,612 B2
(45) Date of Patent: Oct. 8, 2013

(54) COEXISTENCE OF WIRELESS PERSONAL AREA NETWORK AND WIRELESS LOCAL AREA NETWORK

(75) Inventors: Rudolph Alexandre, Saint-Josse-ten-Noode (BE); Wouter Aerts, Mechelen (BE); Martin Ryder, Reading (GB); Viktor Belokonskiy, Zaventem (BE)

(73) Assignee: ST-Ericsson SA, Plan-les-Ouates (CH)

( * ) Notice: Subject to any disclaimer, the term of this patent is extended or adjusted under 35 U.S.C. 154(b) by 1204 days.

(21) Appl. No.: 12/244,778

(22) Filed: Oct. 3, 2008

(65) Prior Publication Data

US 2009/0116437 A1    May 7, 2009

(30) Foreign Application Priority Data

Oct. 5, 2007  (EP) ..................................... 07447055
Feb. 14, 2008  (EP) ..................................... 08447007

(51) Int. Cl.
  *G08C 15/00*       (2006.01)
(52) U.S. Cl.
  USPC ........... 370/328; 370/338; 370/353; 455/439; 455/442
(58) Field of Classification Search
  USPC .......... 370/328, 338; 455/439, 436, 442, 434, 455/352.2
  See application file for complete search history.

(56) References Cited

U.S. PATENT DOCUMENTS 5,875,309  A  *  2/1999  Itkowsky et al. .............. 710/113
2004/0192222  A1 *  9/2004  Vaisanen et al. ................ 455/78
2005/0059347  A1     3/2005  Haartsen
2005/0271010  A1    12/2005  Capretta
2006/0274704  A1    12/2006  Desai et al.
2007/0232358  A1 * 10/2007  Sherman ....................... 455/560

FOREIGN PATENT DOCUMENTS

EP       1 605 643 A1   12/2005
WO   WO 2004/045092 A1    5/2004

OTHER PUBLICATIONS

European Search Report dated Mar. 11, 2008, from corresponding European Application No. 07447055.0.
Lansford J. et al., *Combined Text for Collaborative Coexistence Mechanism Claims*, Project: EEE P802.15 Working Group for Wireless Personal Area Networks (WPANS), Nov. 2001, pp. 1-23, XP002311005.
Communication pursuant to Article 94(3) EPC dated Oct. 28, 2009 from corresponding European Application No. 07447055.0 filed Oct. 5, 2007.

(Continued)

*Primary Examiner* — Huy D Vu
*Assistant Examiner* — Zewdu A Beyen
(74) *Attorney, Agent, or Firm* — Coats & Bennett, P.L.L.C.

(57) ABSTRACT

Wireless transceiver apparatus for operating in a part of the RF spectrum which is shared with a co-located second wireless transceiver apparatus. The first wireless transceiver apparatus includes, a wireless transceiver unit; an arbitration interface for interfacing with an arbitration entity which arbitrates access to the shared part of the RF spectrum between the first wireless transceiver apparatus and the second wireless transceiver apparatus; wherein the arbitration interface is adapted to signal time periods when the wireless transceiver unit is operational, or requests to be operational; and wherein the arbitration interface is adapted to signal data about and commands to the arbitration entity during other time periods. An enhanced arbitration entity is adapted to automatically detect and switch between two modes of interference reduction, e.g. a first interference reduction means such as AFR, a second interference reduction means such as PTA. The arbitration entity gets the information of the first wireless transceiver via the arbitration interface.

36 Claims, 15 Drawing Sheets

(56) References Cited

OTHER PUBLICATIONS

Communication pursuant to Article 94(3) EPC, dated Dec. 3, 2009 from related European Application No. 08165954.2 filed Oct. 6, 2008.

European Search Report dated Apr. 30, 2009 from related European Application No. 08165954.2.
Hunn, N., *Bluetooth and 802.11 Coexistance* [Online] 2006, pp. 1-5, XP002526152, Retrieved from the internet: URL: http://www.ezurio.com/dl/?id=109> [retrieved on Apr. 30, 2009].

* cited by examiner

COEXISTENCE OF WIRELESS PERSONAL AREA NETWORK AND WIRELESS LOCAL AREA NETWORK

FIELD OF THE INVENTION

This invention relates to methods for receiving and transmitting, to transceiver apparatus for operation in a part of the RF spectrum which is shared with a second wireless transceiver apparatus, to a controller for controlling a receiver as well as to software and computer program products to implement the methods.

BACKGROUND TO THE INVENTION

One band of the RF spectrum which is being increasingly used for wireless communications is the unlicensed Industrial Scientific & Medical (ISM) band at 2.4 GHz. Wireless Local Area Network (WLAN) technology, which is standardized in IEEE 802.11, operates in the ISM band. One variant of IEEE 802.11 uses a frequency-hopping spread spectrum (FHSS) technique with 1 MHz channel separation and pseudorandom hops across 79 channels. Another variant (IEEE 802.11b) uses direct sequence spread spectrum (DSSS) techniques, with 22 MHz channels. WLAN technology is widely used in offices, homes and public places to support networking between users. Wireless Personal Area Network (WPAN) technology, which is standardised in IEEE 802.15.1, is another technology which operates in the ISM band. This is a 1 Mbit/s FHSS system which uses the same 79, 1 MHz-wide channels that are used by the FHSS version of IEEE 802.11. IEEE 802.15.1 hops pseudorandomly at a nominal rate of 1600 hops/second. IEEE 802.15.1 is intended as a low power, short range (<3 m) technology for interconnecting devices such as mobile phones, portable computers and wireless handsfree headsets with fixed devices or other portable devices. One commercial implementation of IEEE 802.15.1 is known as Bluetooth™.

Since both IEEE 802.11 and IEEE 802.15.1 operate in the same 2.4 GHz unlicensed ISM frequency band, there is mutual interference between the two wireless systems which may result in severe performance degradation. The interference is of most concern with IEEE 802.11b as this uses a static channel (i.e. no frequency hopping). Factors which determine the level of interference include the separation in distance between the WLAN and WPAN devices, the amount of data traffic flowing over each of the two wireless networks, the power levels of the various devices, and the data rate of the WLAN. Also, different types of information being sent over the wireless networks have different levels of sensitivity to the interference. For example, a voice link may be more sensitive to interference than a data link being used to transfer a data file.

IEEE 802.15.2-2003 "Telecommunications and Information exchange between systems—Local and metropolitan area networks Specific Requirements—Part 15.2: Coexistence of Wireless Personal Area Networks with Other Wireless Devices Operating in Unlicensed Frequency Bands." describes the interference problem and provides some guidance for how WLAN and WPAN equipment can coexist. Two categories of coexistence mechanisms are proposed: collaborative and non-collaborative. Collaborative coexistence mechanisms exchange information between two wireless networks. FIG. 1 shows an example piece of equipment 100 which includes a WPAN transceiver TX1 and a WLAN transceiver TX2. Equipment 100 can be, for example, a portable computer with the WLAN supporting a connection 40 with a WLAN base station 45 and the WPAN supporting a connection 30 with a WPAN device which, in this example, is a wireless headset 35. Some of the possible sources of interference are shown: WLAN transmissions from BS 45 may interfere with reception of WPAN traffic at TX1, or WPAN transmissions from TX1 may interfere with WLAN reception at the base station 45 (path 32); WPAN transmissions from head set 35 may interfere with reception of WLAN traffic at TX2, or WLAN transmissions from TX2 may interfere with WPAN reception at the head set 35 (path 42).

One solution proposed by IEEE 802.15.2 is to provide a packet traffic arbitration (PTA) arbitration device which communicates with both the WLAN station and WPAN station and provides per-packet authorization of all transmissions. FIG. 2 shows an apparatus 100 with an arbitration device 130. Both transceivers TX1, TX2 need to request permission to transmit or receive and, in response, the arbitration device 130 will either grant or deny the permission to access the shared spectrum to transmit or receive a data packet. The recommended PTA interface between a WPAN transceiver and an arbitration device is shown in FIG. 2. It comprises four lines 151-154: RF_Request, Status, Freq and RF_Confirm.

There are limitations to the effectiveness of the existing PTA arrangement. One limitation is that the PTA arbitration device performs arbitration based on a limited amount of information, such as the priority of each station's request. It would be desirable to convey additional information between a WPAN station and a WLAN station (or an arbitrating entity), but providing additional signalling lines would increase the pin count of integrated circuits used in the WPAN and WLAN stations.

SUMMARY OF THE INVENTION

It would be desirable to provide a way of improving the operation of a wireless device in a shared environment.

A first aspect of the present invention provides a first wireless transceiver apparatus for operating in a part of the RF spectrum which is shared with a co-located second wireless transceiver apparatus, the first wireless transceiver apparatus comprising:

a wireless transceiver unit;

an arbitration interface for interfacing with an arbitration entity which arbitrates access to the shared part of the RF spectrum between the first wireless transceiver apparatus and the second wireless transceiver apparatus; wherein the arbitration interface is used to signal time periods when the wireless transceiver unit is operational, or requests to be operational; and wherein the arbitration interface is used to signal data about and/or commands to the arbitration entity during other time periods In one embodiment, the interface is in the form of a bus (PTA bus) that can be used to convey data between the first and second wireless transceiver apparatus.

It has been realized that the existing interface with the arbitration entity (e.g. the PTA entity defined by IEEE 802.15.2) has spare capacity which could be used to carry additional data. One advantage is that this can avoid the need to provide further lines to carry this data which, in turn, avoids the need to provide additional pins on an integrated circuit, or other hardware apparatus although the present invention is not limited thereto.

The arbitration interface may comprise two arbitration interfacing means for interfacing with an arbitration entity which arbitrates access to the shared part of the RF spectrum between the first wireless transceiver apparatus and the second wireless transceiver apparatus; wherein a first arbitration interfacing means is adapted to signal time periods when the wireless transceiver unit is operational, or requests to be operational; and wherein a second arbitration interfacing means is adapted to signal data about the first wireless transceiver apparatus during other time periods.

Advantageously, a sub-set of the lines of the arbitration interface are used to implement a serial interface for signalling the data during said other time periods although parallel interfaces may be used with embodiments of the present invention.

Advantageously, the data comprises at least one of: state of a wireless link; packet type sent over a wireless link; power; SNR; Frequency Hopping Scheme; maximum power on an antenna of the transceiver; ISM noise. The arbitration entity can use this data to make a better-informed decision as to which transceiver apparatus should be granted permission to operate at any time.

Conventionally, an arbiter decides whether to allow—or deny—a request on a per-request basis, based on the priority of the request. However, in situations where the first wireless transceiver apparatus supports multiple simultaneous wireless links, this can result in some of the links receiving an unfair proportion of their access requests denied. A further embodiment of the present invention provides the arbiter with an identity of the wireless link for which the request is being made. This can help to ensure that the arbiter more fairly distributes access to the shared RF band among the plurality of links. Each of the plurality of wireless links can be voice, data or control information.

The first wireless transceiver apparatus can be a Wireless Personal Area Network (WPAN) apparatus, such as an IEEE 802.15.1 (Bluetooth™) apparatus, and the second wireless transceiver apparatus can be a Wireless Local Area Network (WLAN) apparatus, such as one conforming to IEEE 802.11. The first wireless transceiver apparatus and the second wireless transceiver apparatus can be co-located with each other, and co-located with the arbitration entity. The term "co-located" means that the antennas of the respective transceiver apparatuses are less than 1 m apart, e.g. at the same location or tens of mm or cm apart. Optionally, the first wireless transceiver apparatus, the second wireless transceiver apparatus and the arbitration entity are all housed within one device, such as a portable computer, mobile telephone, media player or other electronic apparatus which requires two transceivers. The antennas may be on a single printed circuit board or electronic card, e.g. within a few mm or cm of each other. The first and second wireless transceiver apparatus can share the same antenna.

The arbitration entity can reside on a first integrated circuit which forms part of the Wireless Local Area Network (WLAN) apparatus. The Wireless Personal Area Network (WPAN) apparatus can be implemented as a second integrated circuit which connects to the first integrated circuit via a multi-lined arbitration interface. Alternatively, the arbitration entity, Wireless Local Area Network (WLAN) apparatus and Wireless Personal Area Network (WPAN) apparatus can be implemented as a single integrated circuit, with a multi-lined arbitration interface being used to internally connect hardware modules which implement the arbitration entity and the Wireless Personal Area Network (WPAN) apparatus within the integrated circuit.

A further aspect of the present invention provides a method of operating a first wireless transceiver apparatus for operating in a part of the RF spectrum which is shared with a co-located second wireless transceiver apparatus, the method comprising: arbitrating access to the shared part of the RF spectrum between the first wireless transceiver apparatus and the second wireless transceiver apparatus; signalling time periods when the wireless transceiver unit is operational, or requests to be operational; and signalling data about and/or commands to the first wireless transceiver apparatus during other time periods.

A further aspect of the present invention provides an arbitration entity for arbitrating access to RF spectrum which is shared between a first wireless transceiver apparatus and a second wireless transceiver apparatus which is co-located with the first wireless transceiver apparatus, the arbitration entity comprising: an arbitration interface for interfacing with the first wireless transceiver apparatus and the second wireless transceiver apparatus; wherein the arbitration interface is used to signal time periods when a wireless transceiver unit of one of the wireless transceivers is operational, or requests to be operational, and wherein the arbitration interface is used to signal data about and/or commands to the first wireless transceiver apparatus or the second wireless transceiver apparatus during other time periods.

Advantageously, the first wireless transceiver apparatus is capable of supporting a plurality of different wireless links and at least some items of the data received over the arbitration interface are each associated with an identifier of one of the wireless links. The arbitration entity is arranged to store the data and to use the data to arbitrate requests for accessing the shared RF spectrum.

The functionality described here can be implemented in software, hardware or a combination of these. Accordingly, another aspect of the invention provides software for performing the method when executed by a processor. The software may be installed on the transceiver apparatus at the time of manufacture, or it may be installed onto an existing transceiver apparatus at a later date as an upgrade. The software may be stored on an electronic memory device, hard disk, optical disk or other machine-readable storage medium. The software may be delivered as a computer program product on a machine-readable carrier or it may be downloaded to the transceiver apparatus via a network connection.

BRIEF DESCRIPTION OF THE DRAWINGS

Embodiments of the invention will be described with reference to the accompanying drawings in which.

GLOSSARY

AFH Adaptive Frequency Hopping
BT Bluetooth
PTA Packet Traffic Arbitration (part of the IEEE 802.15.2 recommended practices)
RSSI Received Signal Strength Indication
RX Receive
TX Transmit
WLAN Wireless Local Area Network (IEEE 802.11)

DETAILED DESCRIPTION

The present invention will now be described with reference to certain embodiments and with reference to the above mentioned drawings. Such description is by way of example only and the invention is not limited thereto. In particular the present invention will be described with reference to radio communications network but the present invention is not limited thereto. The term "wireless" should be interpreted widely to cover any communications system which does not use fixed wireline communications for some of its transmissions. Alternative wireless communications systems include optical systems such as those operating with diffuse infra-red. It should also be noted that the term "wireless" also includes so-called cordless systems. General aspects of cordless communications systems are described, for instance, in the book by W. Tuttlebee, "Cordless Telecommunications Worldwide", Springer, 1997. Cordless systems are generally local, uncoordinated radio communications networks having a limited range.

Figure 1:
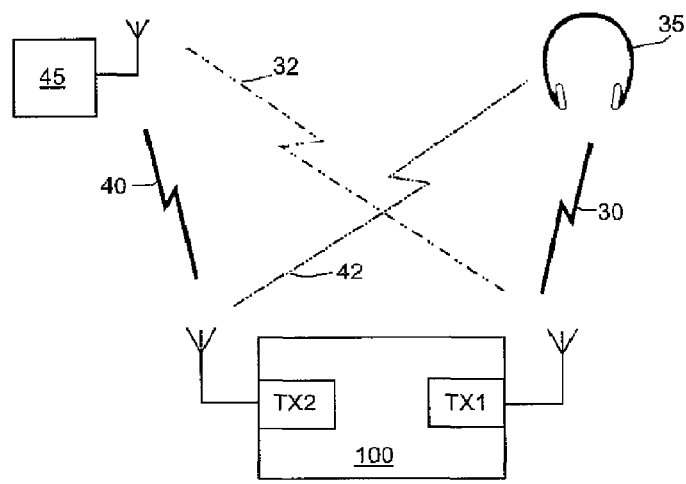
FIG. 1 shows an apparatus with two co-located wireless transceivers operating in the same RF band.
Figure 2:
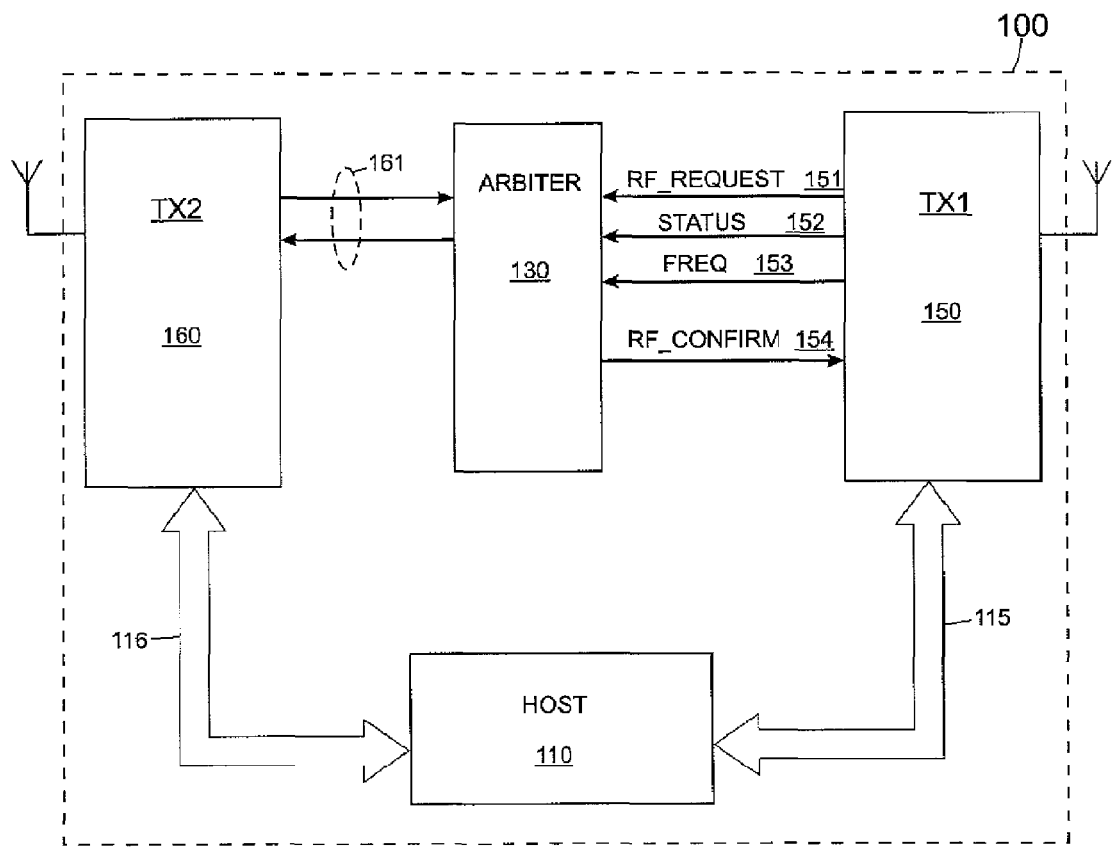
FIG. 2 shows the apparatus of FIG. 1 with an arbitration unit for co-ordinating access to the common RF band.

Referring again to FIG. 2, this shows an apparatus in which a transceiver TX1 of a first wireless system, e.g. a WPAN, such as a WPAN based on a IEEE 802.15.1 protocol, e.g. Bluetooth, and a transceiver TX2 of a second wireless system, e.g. a WLAN, such as a WLAN based on IEEE 802.11b, are co-located with one another at an apparatus 100 as can be used with embodiments of the present invention. An arbitration device 130 communicates with TX1 via an interface 151-154 and with TX2 via a similar interface. For example, the interface may be a four-lined interface (shown simply as interface 161). The interface between the WPAN transceiver TX1 and the arbiter 130 comprises four lines 151-154. TX1 uses line 151 (TX_REQUEST) to request access the shared RF band. The priority of the request is indicated by setting line 152 (STATUS) high (high priority) or low (low priority) at a similar time to making the request. The Frequency line 153 (FREQ) is an optional line, and can be used to indicate that TX1 intends to 'hop' into one of the restricted (shared) channels during the next transmission/reception slot.

The arbiter 130 uses line 154 (TX CONFIRM) to indicate whether TX1 is allowed to operate in the next slot. If TX1 is not allowed to operate, it should not transmit during the next slot.

In a similar manner to TX1, TX2 of the WLAN uses the same type of interface 161 to indicate when it wishes to access the shared RF band and receives a signal indicating permission or denial to transmit from the arbiter 130.

Each attempt to transmit by either TX1 or TX2 is submitted to the arbiter 130 for approval. The arbiter 130 may deny a transmit request that would result in a collision. The arbiter 130 provides a permission/denial signal to both TX1 and TX2 on a per packet/slot basis. When a collision would occur, the arbiter 130 prioritizes transmissions of TX1 and TX2 based on the priorities of the transmissions that it receives on line 152 and interface 161.

Figure 3:
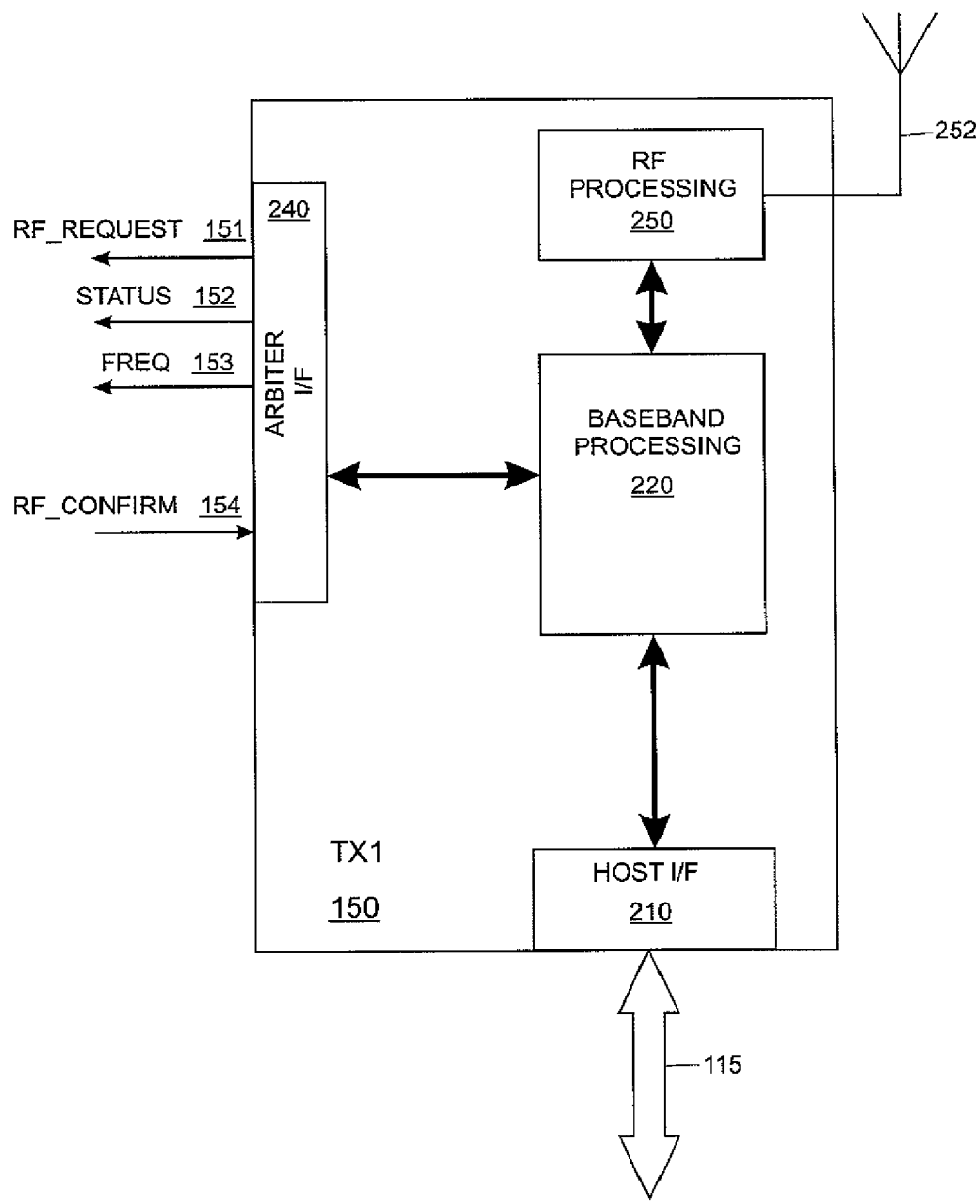
FIG. 3 shows the first wireless transceivers in more detail.

FIG. 3 shows transceiver TX1 in more detail. An interface 210 communicates 115 with a host 110. The host can provide the data which is to be transmitted by the transceiver TX1, such as voice data or data for a file transfer. A baseband processing unit 220 packetizes the data, if necessary, and issues transmission requests which are sent to the arbiter interface unit 240 for transmission along lines 151-153. A permission/denial signal is received from interface unit 240. An RF processing unit 250 performs modulation to RF for transmission via antenna 252. As noted above, TX1 can support multiple (e.g. 7) simultaneous connections, called links. As an example, one link may carry voice data between unit 100 and handsfree headset 35, while another link may carry data between unit 100 and another portable device. Bluetooth defines a number of different types of link, including Synchronous Connection-oriented (SCO) links which carry constant bit rate data, such as voice data, and Asynchronous Connection-oriented (ACL) links which carry data or control data (ACL-C). SCO links generate a series of packets at regular time intervals whereas ACL links generate packets at irregular time intervals. Conventionally, the PTA interface has a two-level priority scheme (priority=0 or priority=1).

The PTA algorithm is only active when TX1 asserts the RF_REQUEST signal. In accordance with an embodiment of the present invention, a sub-set of the lines of the existing PTA interface—i.e. the lines STATUS, FREQ and RF_CONFIRM—are used as a serial interface to serially transfer additional information from TX1 to the arbiter 130. The present invention is not limited to serial interfaces, e.g. parallel interfaces may be used. The serial interface can be used whenever the RF_REQUEST line is not asserted (RF_REQUEST line is low). This additional information can comprise one or more of the following:

state of a BT link, e.g. active, sleep, deep sleep;
packet types;
Master or Slave (M/S);
Intervals;
Power and SNR
Frequency Hopping Scheme, and details of the scheme, e.g. channels used in the scheme;

The above list is not exhaustive, and it will be understood that other parameters can be communicated over the serial interface (or parallel interface). Some of the parameters will depend on the particular type of link that the parameter is measured for and this may depend upon the protocol used, e.g. a Bluetooth link or other. When communicating the additional information, it will be indicated for which of the links this additional information is applicable.

The serial (or parallel) interface can be driven by software. The advantage is the flexibility in the kind of information that can be exchanged and thus on the use that is made of it. Software allows upgrades and improvements to be implemented, e.g. if reprogrammable components are used. However, other interfaces may be used, e.g. hardware interfaces.

Figure 4:
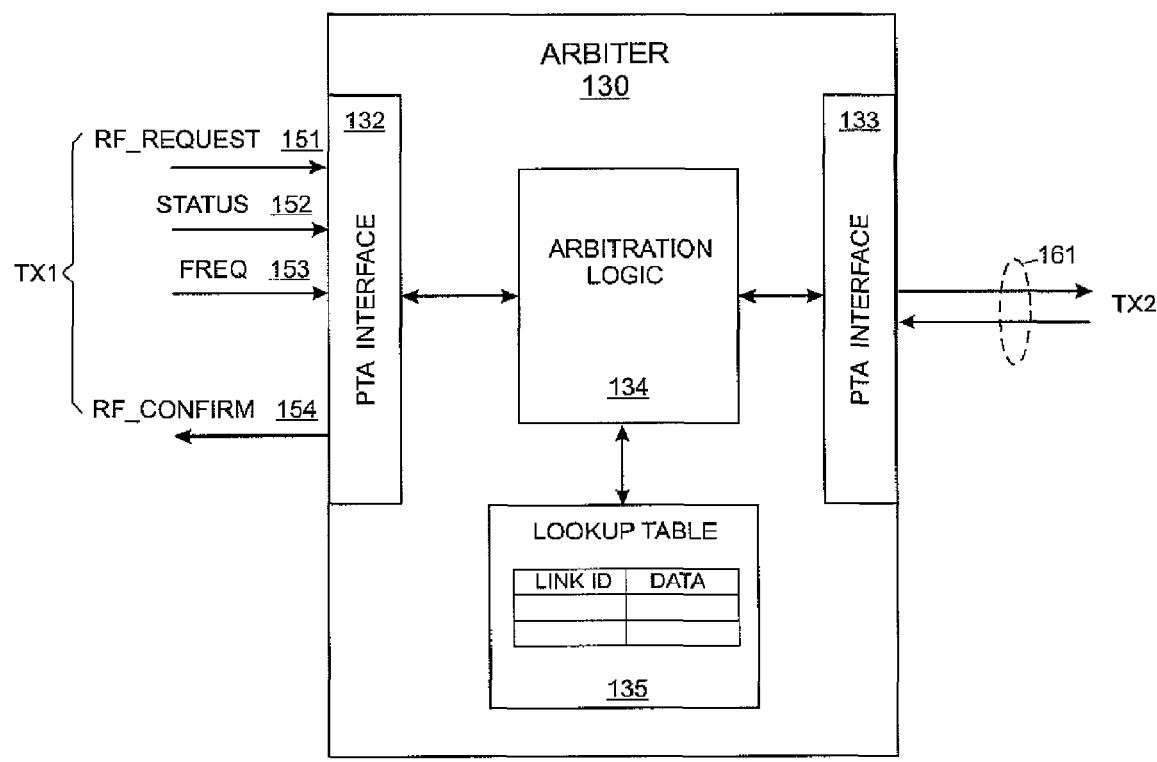
FIG. 4 shows the arbitration unit in more detail.

FIG. 4 shows arbiter 130 in more detail. A PTA interface part 132 connects to the RF_REQUEST, STATUS, FREQ, and RF_CONFIRM lines of the PTA interface to TX1. Similarly, a PTA interface part 133 connects to the lines of a PTA interface 161 to TX2. Arbitration logic 134 receives requests to access the shared RF spectrum from TX1 (via lines 151-154) and TX2 (via interface 161) and grants permission to one of the transceivers TX1, TX2 at any time. Arbiter 130 stores the additional information received about BT links in a lookup table 135. One advantageous embodiment of this table is a lookup table which is indexed by the BT link ID. Data relevant to a particular BT link is stored alongside the BT Link ID for that link. Upon receiving a request, the arbiter checks the lookup table 135 to find the characteristics of the BT link associated with the request. As an example, consider that TX1 simultaneously supports a first BT link which is used for voice transfer and a second BT link which is used for data transfer. Both links have the same PTA priority level. TX1 submits requests to access the shared RF spectrum on behalf of both links. Conventionally, the arbiter 130 would see two requests having the same priority level. However, in accordance with the present invention, the arbiter 130 also receives an identifier of the link. This can be used to lookup details of the link, to help the arbiter make a better decision about which link should be granted access to the spectrum. Arbiter can also maintain a log of which links have been granted access, and can use this to grant or deny future requests.

The one wireless apparatus, e.g. TX1 always has to request medium access from the other wireless apparatus, e.g. TX2. The additional on-chip serial interface provides additional link information to the PTA algorithm coming from the BT apparatus. The information on the link ID is then most useful for the arbitration. The information provided to the arbiter about the link may be used by the arbiter in various ways. For instance by maintaining a log of the usage of each link, a fairer protocol may be employed, e.g. avoiding that just one link obtains the majority of use. Also priorities may be set for each link separately and the arbiter may decide on a link-by-link basis using the priority. With the serial link, the WLAN can make a finer priority handling. The above embodiment provides an advantage that real-time link identification is added to the PTA interface to allow the PTA algorithm to associate a particular BT request to its link information. Priority information can be provided by the WLAN sub-system. Feedback to the WLAN sub-system allows for smarter scheduling to fit in between BT transmissions. The arbiter is aware of available retransmissions and can grant them such that the free time for the WLAN transactions is high, e.g. 5 ms, hence providing a better WLAN service. For example, when the WLAN knows that a BT periodic SCO is ongoing, it can take the periodicity of the BT into account and schedule its TX better such that the WLAN TX falls in the quiet periods of the BT. An additional advantage is that commands can be sent over the serial interface.

The conventional protocol for submitting a request for RF access over the PTA interface will now be described in more detail. A signal called RF_REQUEST is generated by the WPAN station TX1 on the RF_REQUEST line 151 every time the WPAN station TX1 wishes to perform a transaction. The term 'transaction' means a number of consecutive TX/RX bursts (in the case of the WPAN station being a MASTER) or RX/TX bursts (in case of the WPAN station being a SLAVE). The RF_REQUEST signal has to be asserted high some time earlier than the radio is actually switched on and must remain high for the entire duration of the transaction. This signal is used by the WPAN station to indicate to the PTA that it has to do something at RF level. A signal called STATUS is generated by TX1 in parallel to the RF_REQUEST. For the first few microseconds this signal indicates with a 1 the fact that the transaction is a transaction with Priority and with a 0 the fact that the transaction has no priority. After this period the signal is held high during the TX part of the transaction. A signal called FREQ is generated by TX1 to inform that the current slot occupies a frequency also in use on the WLAN side. This signal is optional.

The arbiter 130 generates a signal called RF_CONFIRM, which is active low. In case the arbiter 130 wants to block TX1 from performing the requested transaction, it should assert this signal high before a predefined number of microseconds have passed from the moment RF_REQUEST was asserted high. If this happens, TX1 is instructed not to perform the requested transaction or at least not to perform the TX part of the transaction. TX1 may inhibit both TX and RX, or just the TX part of a transaction. The signals described above can be externally pulled down.

In accordance with an embodiment of the present invention, the protocol described above is modified to signal an additional piece of information. This information may be related to a link parameter of the link for which the request is being made. Preferably the additional information is an identifier (Link ID) of the Bluetooth link for which the request is being made. The Link ID can be signalled by any means available, e.g. on any line or communication path. For example it can be signalled on the FREQ line.

Figure 5:
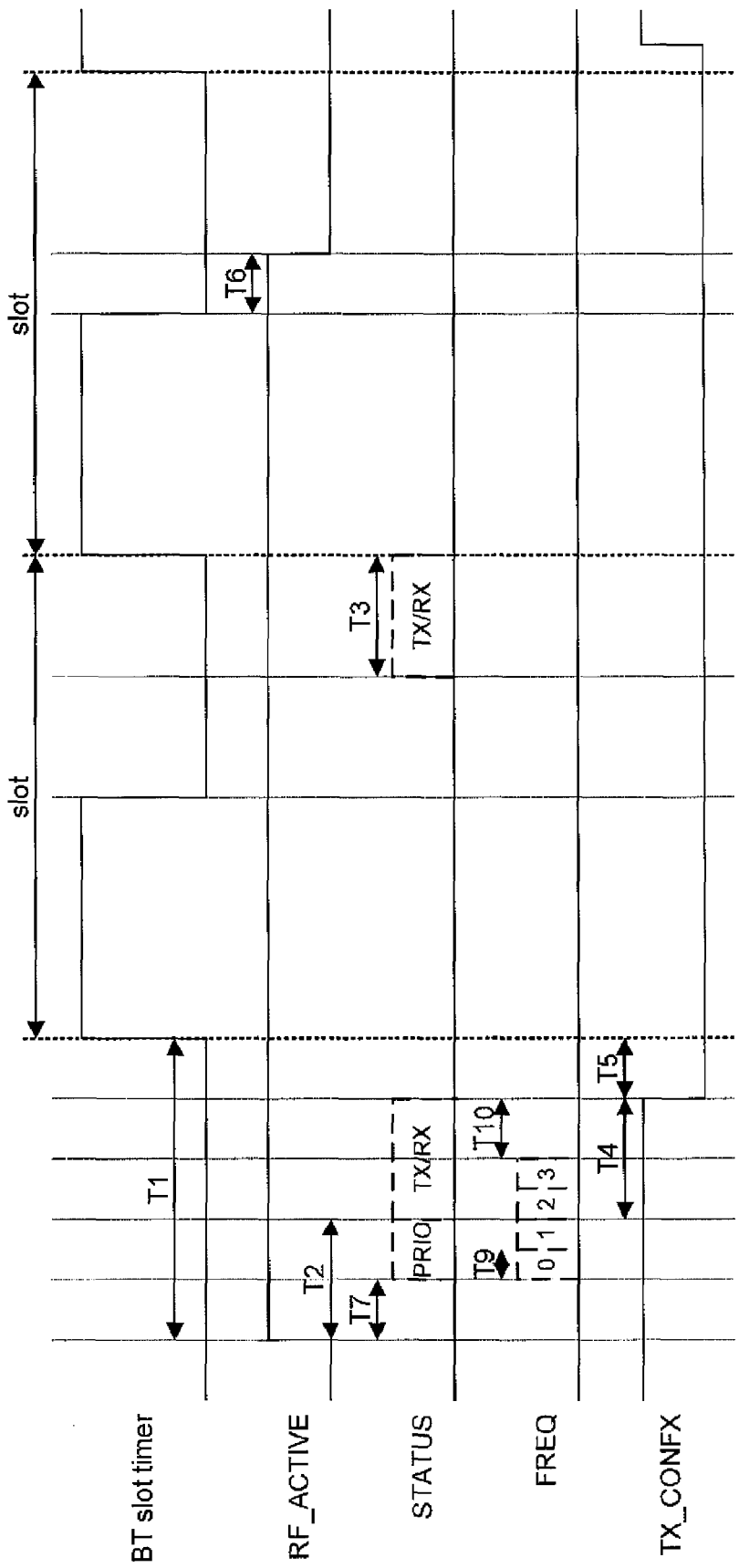
FIG. 5 shows a scheme for signalling Link ID in accordance with an embodiment of the present invention.

In an embodiment where the arbiter receives additional information from TX1 about each link, the arbiter can use the additional information such as the Link ID to assess which request should be granted access. The additional information stored in the lookup table 135 can supplement the simple two-level priority scheme of the conventional PTA protocol. FIG. 5 shows a first way in which Link ID can be signalled. Conventionally, on the STATUS line, two bits are sent before the first slot start: one during T2–T1 and one during T4. A four-bit code, representing the Link ID, is sent on the FREQ line during T2+T4. The four-bit code can represent up to sixteen Link IDs.

As described above, the PTA interface is used as a serial interface when the RF_REQUEST line is low. The following table presents one way of re-using the lines of the PTA interface to implement a serial interface:

| Conventional PTA line | Direction | Serial interface line | Serial bus function |
| --- | --- | --- | --- |
| RF_REQUEST | BT to WLAN | SERIAL_ACTIVE_N | low means serial link active |
| STATUS | bidirectional | SERIAL_CLK | Interface clock |
| FREQ | Bidirectional | SERIAL_DATA | Interface data |
| RF_CONFIRM | WLAN to BT when no transfer, bidirectional otherwise | SERIAL_REQorACK | Request to transfer from WLAN side. Active high. |

The 'master' is defined as TX1 (BT) and the 'slave' is defined as TX2 (WLAN). This it to ease the global management; indeed the TX1 (BT) side has the more data to transfer.

When no data transfer is executed, both SERIAL_CLK and SERIAL_DATA lines are high. When data needs to be transferred from TX1 (BT) to TX2 (WLAN), TX1 starts generating the clock SERIAL_CLK and transmits data on SERIAL_

DATA. At the end of the transfer, the clock is stopped. The signal SERIAL_REQorACK is used to acknowledge the transfer by the receiver TX2 (WLAN).

On the other hand, when data needs to be transferred from TX2 (WLAN) to TX1 (BT), the TX2 side first asserts the SERIAL_REQorACK signal. As acknowledgement, TX1 BT starts generating the clock SERIAL_CLK and receives data on SERIAL_DATA from WLAN side. At the end of the transfer, the clock is stopped. The signal SERIAL_REQorACK is used to acknowledge the transfer by the receiver (TX1).

It can be seen that, in this scheme, the signal SERIAL_REQorACK has two different purposes: to request a transfer from WLAN; and to acknowledge any transfers (from BT or WLAN).

The details of the physical layer of the serial interface are open to implementation and are not considered a limiting feature of embodiments of the present invention. Features of existing 2-wire protocols, such as I²C can be used. However, when compared to the I²C specification, the following differences exist:
- no pull-up resistors need be used—to reduce cost and complexity;
- there is no address phase, as there is only a master and a slave connected to the interface;
- an extra request signal for the WLAN slave to request a transfer can be used;
- the same signal is used to acknowledge the transfer.

The serial link implemented inside WLAN device can be used on top of a PTA algorithm inside the WPAN device. The selection between the algorithms can be done by using the rf_request signal. When rf_request is low, the algorithm inside WLAN device is active and when it is high, the logic inside the WPAN device is active. To do the multiplexing of the signals, the signals of the WPAN device are routed to the WLAN device and they are muxed with internally generated signals inside the WLAN device by looking to the value of rf_request.

Figure 6:
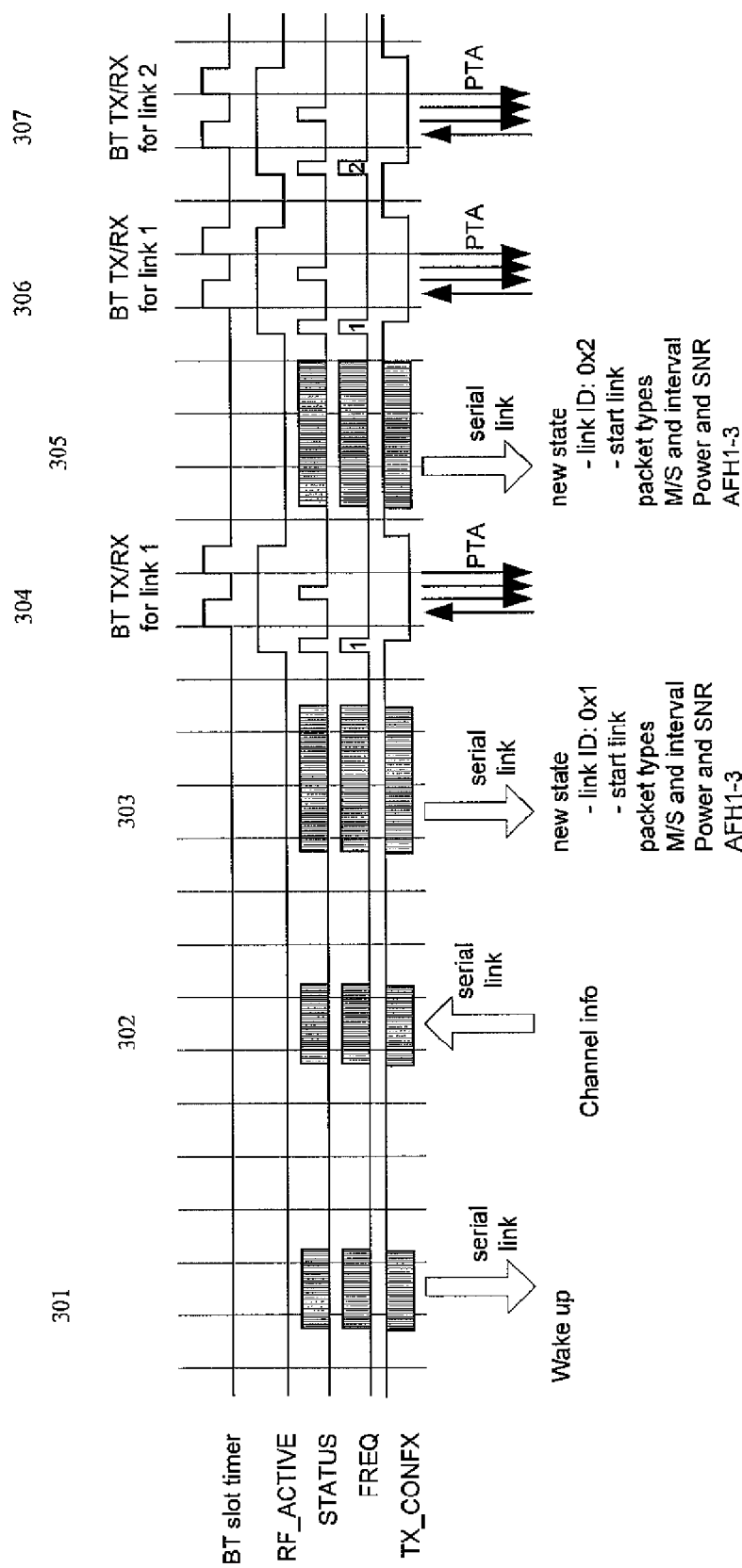
FIG. 6 shows an example of use made of the arbitration interface over a period of time in accordance with an embodiment of the present invention.

FIG. 6 shows an example of how the four-line PTA interface can be used over a period of time. During periods 301, 303, 305 information is sent from TX1 to TX2, e.g. via the arbiter in TX2. During period 302 information is sent from TX2 to TX1, i.e. via the arbiter of TX2. At times 304, 306, 307 TX1 uses the PTA interface to signal that it intends to transmit/receive in the shared RF band. This signalling comprises raising a signal on the RF_ACTIVE line, signalling the priority of the transmission on the STATUS line, and signalling the ID of the link on the FREQ line. At other times, the interface is unused. The signal TX_CONFX is high when it is blocking the TX1 (WPAN, e.g. BT) transaction. When it is low it grants the TX1 request for a transaction.

The following gives further detail of the signalling scheme as an example only. This is based on the I²C specification (v.2.1, January 2000) unless explicitly mentioned. The present invention is not limited to the I²C specification.

Figure 7:
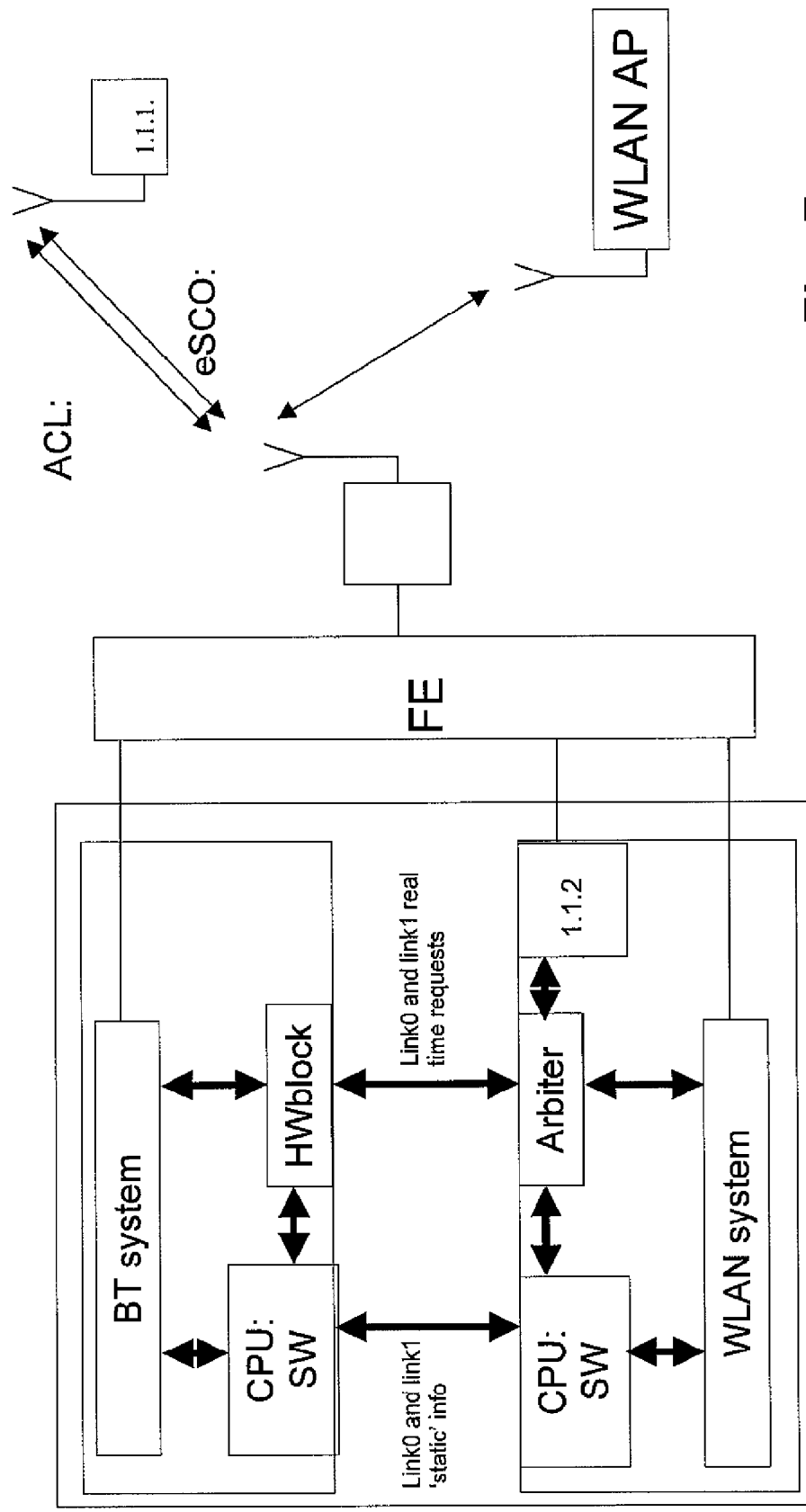
FIGS. 7 and 8 show adjacent first and second wireless transceivers in accordance with an embodiment of the present invention and how quasi-static or real time data is transferred.
Figure 8:
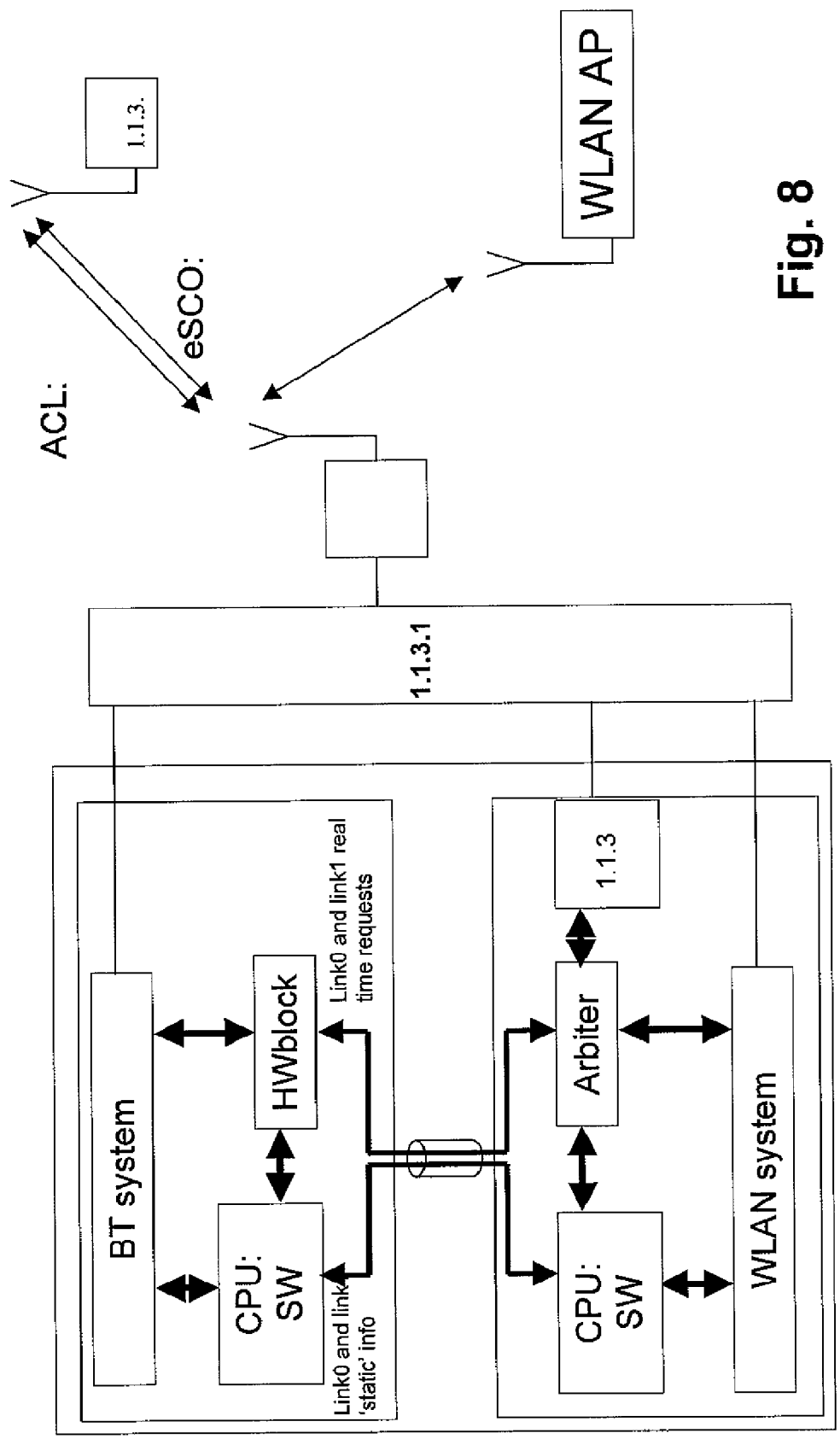
Figure 9A:
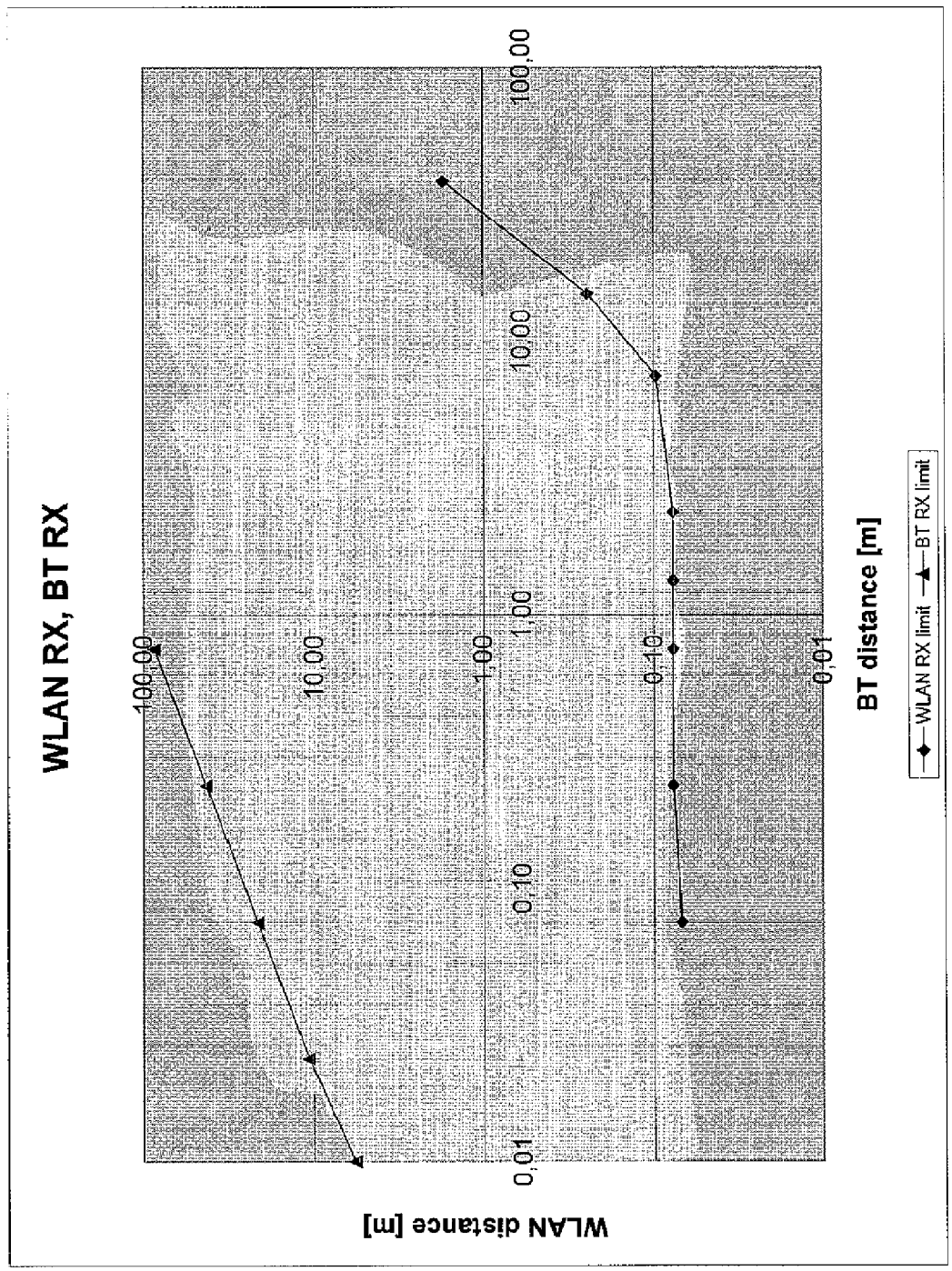
FIGS. 9A to D show schematically the AFH region The AFH region, in distance, for the different combinations of WLAN/BT, TX/RX (BT 2 Mbps, WLAN 54 Mbps), in distance, for the different combinations of WLAN/BT, TX/RX (BT 2 Mbps, WLAN 54 Mbps)
Figure 9B:
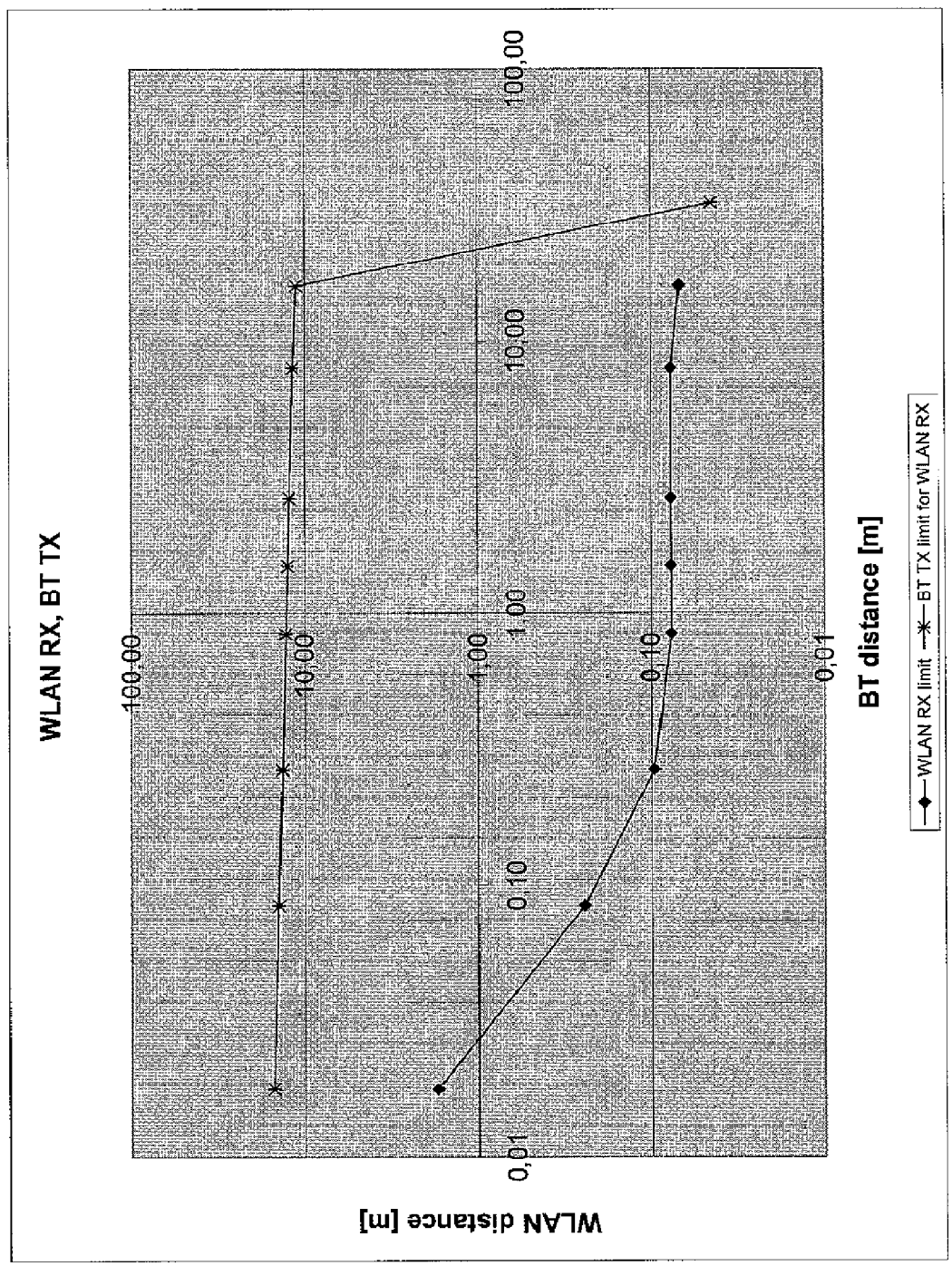
Figure 9C:
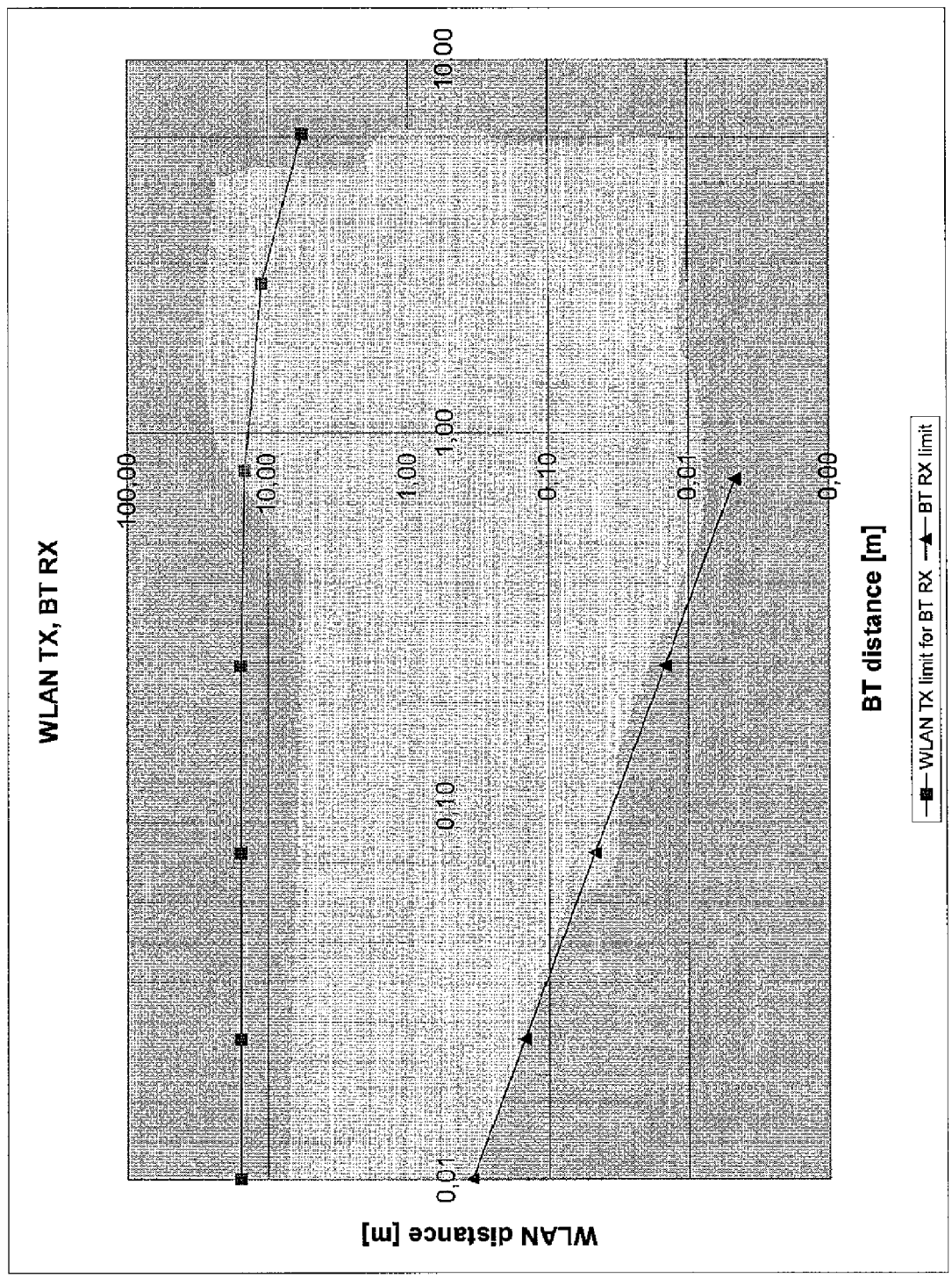
Figure 9D:
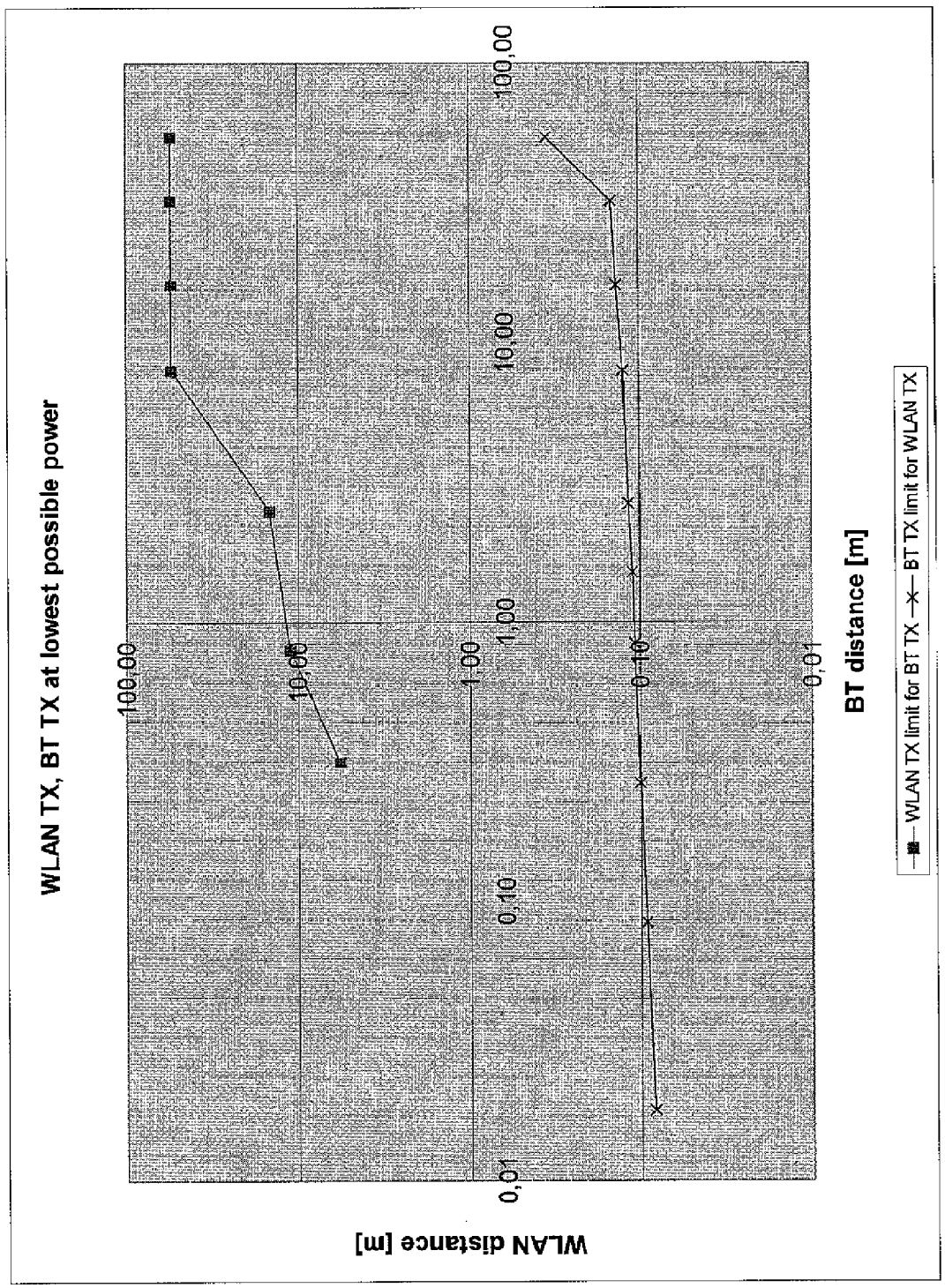
Figure 10A:
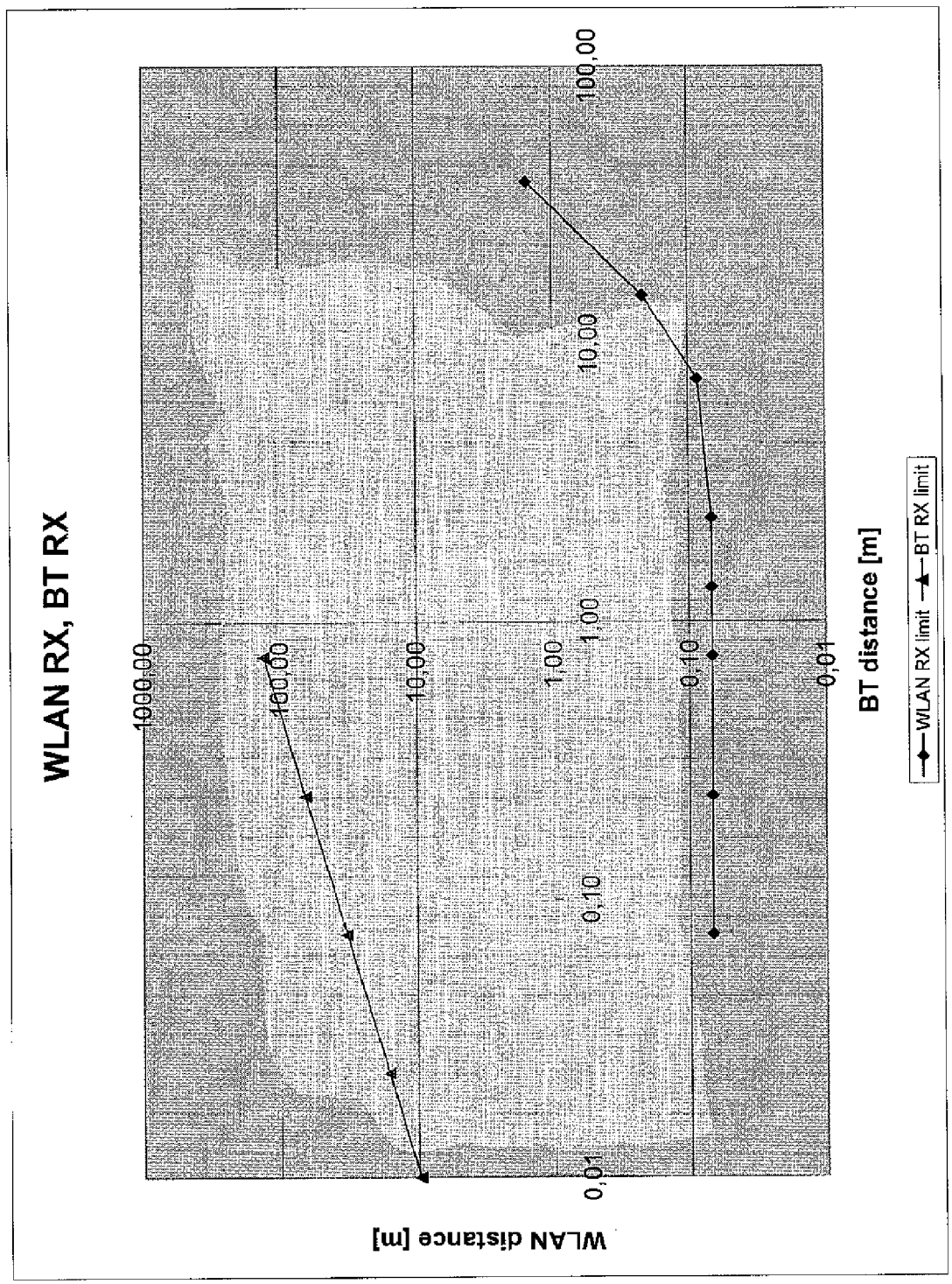
FIGS. 10A to D show schematically the AFH region where AFH can be applied alone, in distance, for different combinations of WLAN/BT, TX/RX (BT 1 Mbps, WLAN 36 Mbps).
Figure 10B:
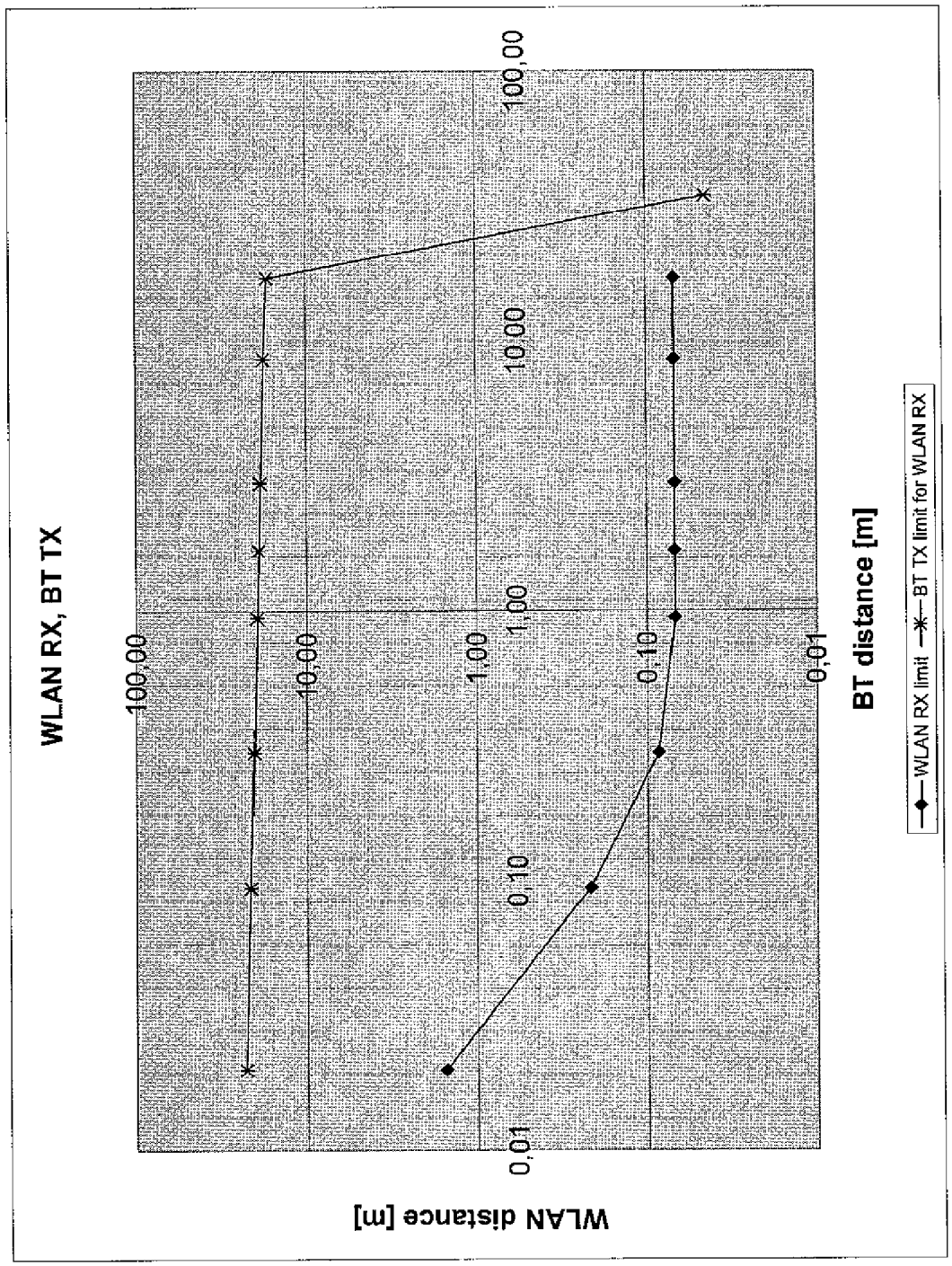
Figure 10C:
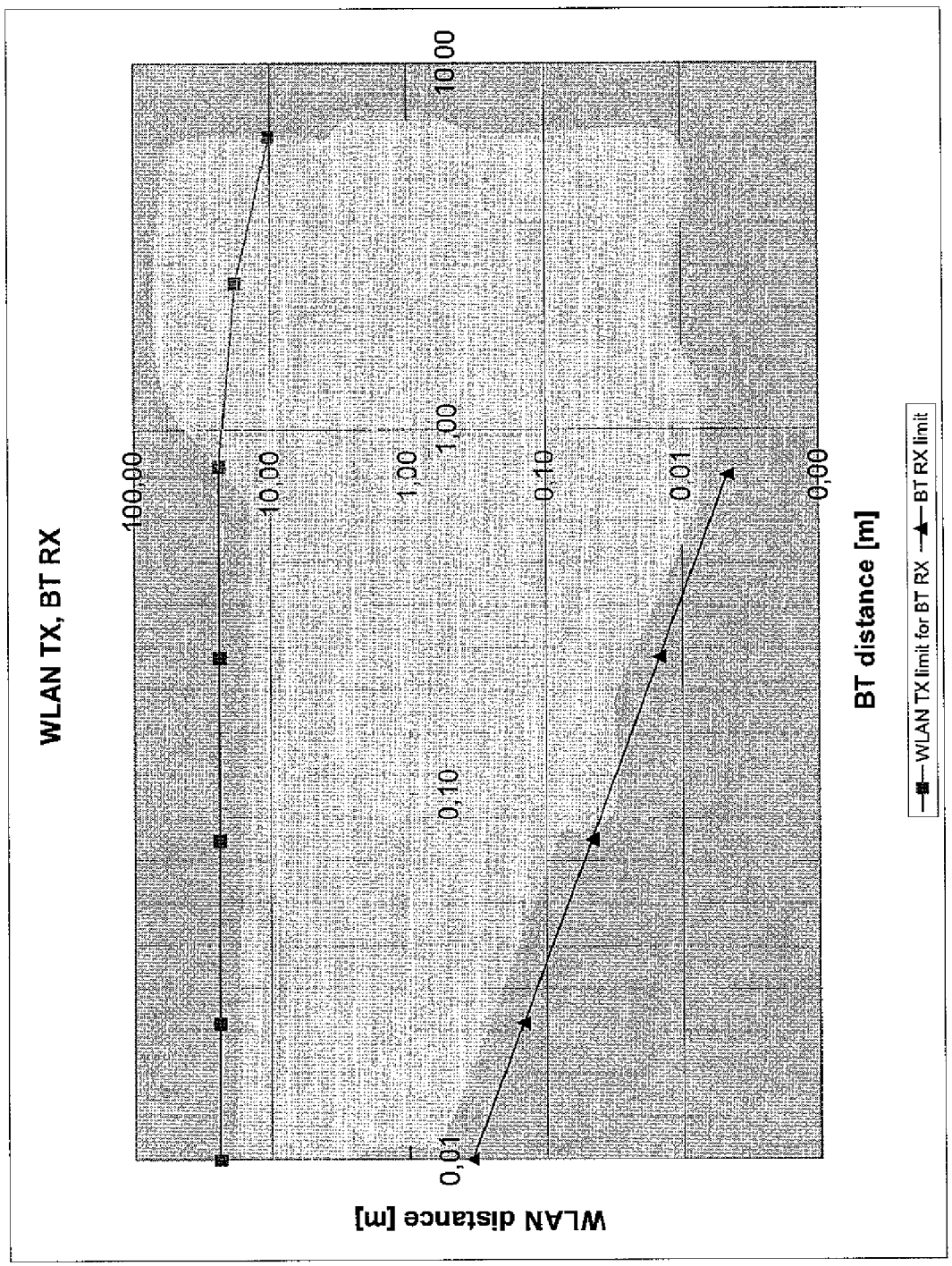
Figure 10D:
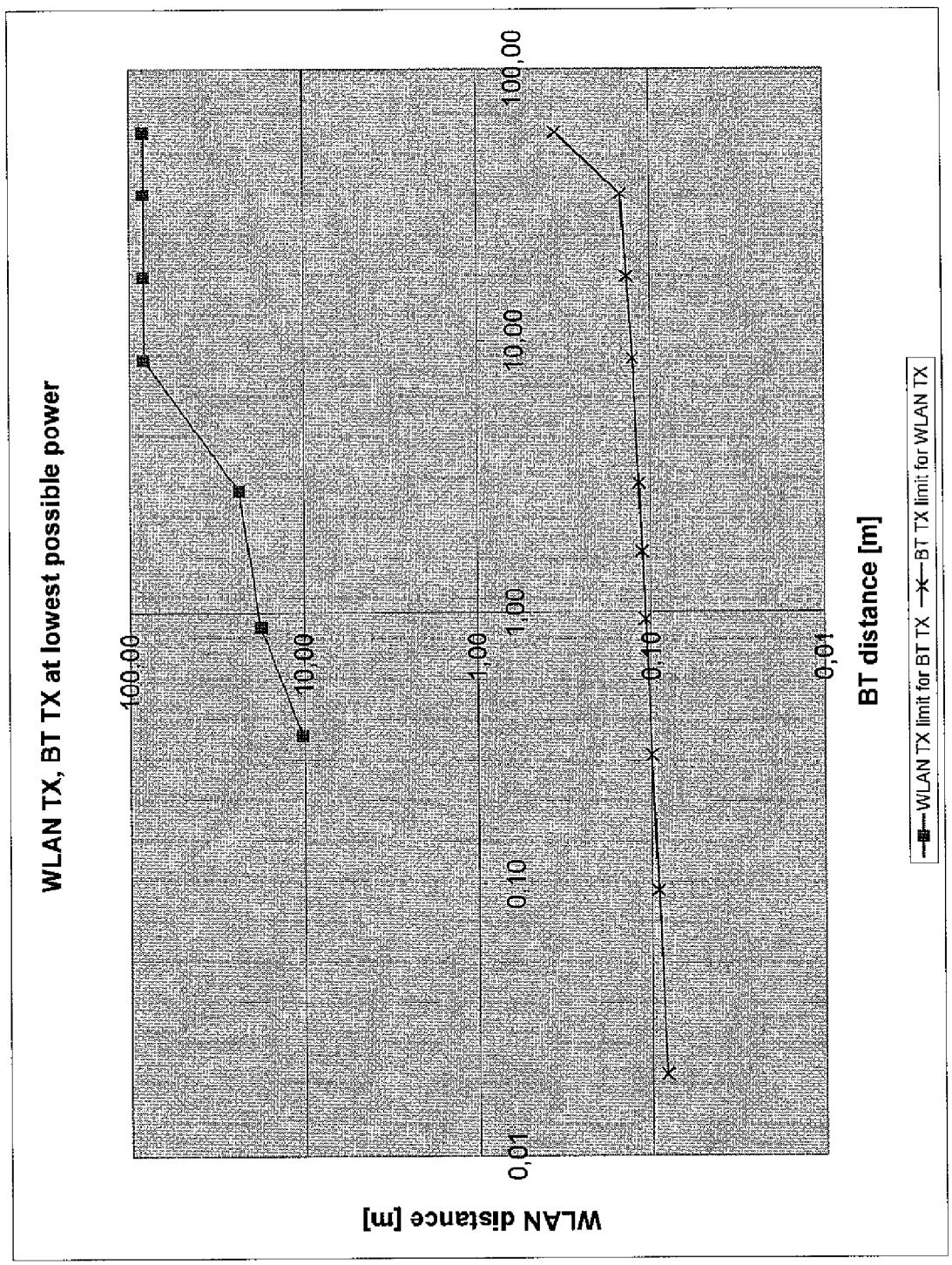

FIGS. 7 and 8 show a first and a second wireless device (WPAN (BT) and WLAN) placed side by side and sharing a common antenna, e.g. on a common PCB.

As shown schematically in FIGS. 7 and 8, the exchange of quasi-static information can be made over the serial link between the two CPU's of the first and second wireless apparatus, e.g. between the WPAN and the WLAN devices. The real time information is transferred between the WPAN device and the WLAN via a hardware block (HW) in the WPAN device (BT) and the arbiter in the WLAN. The CPU of FIGS. 7 and 8 may include a microprocessor such as an Intel Pentium microprocessor or may be an embedded processor, e.g. an ARM processor core as described in "ARM, System-on-chip architecture" by Steve Furber, Addison-Wiley, 2nd edition, 2000, e.g. as a VLSI chip around an embedded microprocessor such as an ARM7TDMI core designed by ARM Ltd., UK which may be synthesized onto a single chip. The CPU may be a programmable digital logic device such as a Programmable Array Logic (PAL), a Programmable Logic Array, a Programmable Gate Array, especially a Field Programmable Gate Array (FPGA) or any other similar processing engine.

Accordingly, in embodiments of the present invention a first wireless transceiver apparatus operates in a part of the RF spectrum which is shared with a co-located second wireless transceiver apparatus. An arbitration entity controls access to the shared RF spectrum between the first and second wireless transceivers. An arbitration interface connects the first transceiver to the arbitration entity. The arbitration interface is adapted to signal when the wireless transceiver unit is operational and when the wireless transceiver unit requests to be operational. This occurs during first time periods, and is best shown in FIG. 7; see the time periods 304, 306, 307. Also, the arbitration interface is adapted to signal data about the first wireless transceiver apparatus during other time periods. This occurs during the time periods 301, 302, 303, 305 in FIG. 7. An advantage of this arrangement is that the arbitration entity can make a better informed decision about which transceiver should be granted access to the shared RF spectrum, without requiring additional connecting lines.

Embodiments of the present invention also includes software for performing any of the methods of the present invention. In particular embodiments of the present invention provide software having code segments for implementing a method of interfacing a first wireless transceiver apparatus (for operating in a part of the RF spectrum which is shared with a co-located second wireless transceiver apparatus) to an arbitration entity which arbitrates access to the shared part of the RF spectrum between the first wireless transceiver apparatus and the second wireless transceiver apparatus when implemented on a processing engine. The software is adapted to use the arbitration interface to signal time periods when a wireless transceiver unit of one of the first and second wireless transceiver apparatus is operational, or requests to be operational, and to use the arbitration interface to signal data about the first wireless transceiver apparatus during other time periods.

The present invention includes software having code segments that control receipt of signalling over an arbitration interface during time periods when a wireless transceiver unit of one of a first wireless transceiver apparatus and a second wireless transceiver apparatus is operational, or requests to be operational, and to control receipt of data about the first wireless transceiver apparatus or the second wireless transceiver apparatus during other time periods.

Having described a wireless transceiver apparatus for operating in a part of the RF spectrum which is shared with a co-located second wireless transceiver apparatus, wherein the first wireless transceiver apparatus comprises a wireless transceiver unit and an arbitration interface for interfacing with an arbitration entity which arbitrates access to the shared part of the RF spectrum between the first wireless transceiver apparatus and the second wireless transceiver apparatus, the arbitration interface being adapted to signal time periods when the wireless transceiver unit is operational, or requests to be operational being adapted to signal data about the first wireless transceiver apparatus during other time periods, an application of this interface will now be described.

A carefully applied first interference reducing means such as a frequency hopping scheme (for example, slow frequency hopping), e.g. adaptive frequency hopping (AFH), can be used such that that communications according to one protocol such as Bluetooth (BT) are kept separate from communications according to a second protocol such as WLAN, e.g. the communications are separated in frequency: for the first protocol (BT) only transmitting and receiving is done at frequencies in which communications of the second protocol (WLAN) are not being sent and/or transmitted. Thus, for example, AFH makes sure that there is no direct interference of WLAN signals with BT signals and vice versa. However, WLAN noise can still interfere with BT signal and vice versa. That is, for high WLAN power and low BT power, the BT signal is corrupted by the WLAN noise and vice versa.

In the following reference will be made to co-existence of a radio frequency WLAN device and a radio frequency PAN device such as Bluetooth radio frequency device. However it should be understood that in each case reference is made to a first wireless transceiver apparatus for operating in a part of the RF spectrum which is shared with a co-located second wireless transceiver apparatus, respectively.

As already described above, a second interference reducing means such as a packet transfer arbiter (PTA) provides a separation in time between communications according to one protocol such as Bluetooth (BT) and communications according to a second protocol such as WLAN, e.g. that BT and WLAN signals are separated in time. WLAN is only active when BT is not active and vice versa. This ensures that there is no interference between WLAN and BT. As indicated above the PTA arbiter can be located in the WLAN chip.

For certain combinations of WLAN power and BT power, the first interference reducing means such as AFH will be sufficient to prevent interference between BT and WLAN, and full throughput can be reached. For other combinations of WLAN power and BT power, AFH is not sufficient and the second interference reducing means such as PTA needs to be used to prevent interference between BT and WLAN, limiting the throughput that can be reached on both. The combinations of WLAN and BT power for which AFH only is sufficient, can be, for example: BT approx. 1 m from remote device, WLAN within 10 to 20 m from the WLAN remote device. This is for a single antenna. For dual antennae, the number of possible combinations of WLAN and BT power increases, i.e. allowing more use cases.

An enhanced arbitration method and apparatus according to an embodiment of the present invention will automatically detect and switch between those two modes or interference reduction, e.g.

a first interference reduction means such as AFH only a second interference reduction means such as PTA Preferably, the enhanced arbitration entity can switch dynamically between those two modes for a plurality of combinations, e.g. between 4 different combinations of WLAN and BT, TX and RX.

The enhanced arbitration entity is located in the WLAN chip and gets the information of the BT TX and RX power via the serial link between BT and WLAN.

For any particular implementation for a dual system, there are regions on the WLAN distance vs. BT distance characteristic where AFH alone is sufficient to prevent interference between BT and WLAN (FIGS. 9A to D for BT 2 Mbps and WLAN 54 Mbps—schematic only).

Four points or corners can be identified on these graphs:
WLAN TX, BT TX: if an operation point (POINT1) is below/right from the WLAN TX limit AND above/left from the BT TX limit, then AFH can be applied, otherwise PTA needs to be applied
WLAN TX, BT RX: if an operation point (POINT2) is below/left from the WLAN TX limit AND above/right from the BT RX limit, then AFH can be applied, otherwise PTA needs to be applied
WLAN RX, BT TX: if an operation point (POINT3) is above/right from the WLAN RX limit AND below/left from the BT TX limit, then AFH can be applied, otherwise PTA needs to be applied
WLAN RX, BT RX: if an operation point (POINT4) is above/left from the WLAN RX limit AND below/right from the BT RX limit, then AFH can be applied, otherwise PTA needs to be applied.

This curve is for BT 2 Mbps and WLAN 54 Mbps. For lower rates, the required SNR and sensitivity change and this implies that the limit curves shift. For example, this can mean that the window for AFH becomes larger. See for example FIGS. 10A to D.

In a method according to an embodiment of the present invention first power control is used to try and ensure that all 4 points (POINT1-POINT4) fall within the AFH limits.

One realistic use case that could be associated with these powers is a BT link from mobile to headset (approx. 1 m distance) and a WLAN link from mobile to access point that is not too far away (<20 m).

The enhanced arbitration entity is aware of the 4 real time points (POINT1-POINT4) and the 4 limit curves (FIGS. 9-10). When the 4 points (POINT1-POINT4) fall within the limits for AFH alone, the PTA is disabled, i.e. BT and WLAN can TX/RX when they want. When 1 of the 4 points falls out of AFH limits, the enhanced arbitration entity should enable the PTA.

Next, if it is not possible to have all 4 points (POINT1-POINT4) within the AFH limits, it could still be possible to have some of the 4 points within the AFH limits.

The Enhanced arbitration entity is aware of the 4 real time points (POINT1-POINT4) and the 4 limit curves (FIGS. 9-10), such that the correct combinations of WLAN and BT TX/RX can be allowed or prohibited. E.g. if the WLAN TX/BT TX and WLAN RX/BT RX points are within the AFH limits, while the WLAN RX/BT TX and WLAN RX/BT TX fall out of the AFH limits, the PTA is enabled for WLAN RX/BT TX and WLAN RX/BT TX and disabled for WLAN TX/BT TX and WLAN RX/BT RX.

A more detailed description of an embodiment of the present invention is as follows. The following is assumed:
A serial link as described above is provided to transfer the information between BT and WLAN. During PTA signaling, the BT link ID is sent on the FREQ line such that the enhanced arbitration entity knows for which link this PTA request is. The relationship between TX power and RSSI and correct conversion to power on antenna is known. For both BT and WLAN, the real time TX power and RX power should be exchanged to the arbitration entity. The TX power and RX power should be referenced to the antenna. Thus a correct conversion from RSSI to absolute RX power at the antenna is available. The noise levels for different TX/RX powers should be exchanged to the arbitration entity.
General Information Exchange:
1) BT sends noise info to the arbitration entity
This information is sent over the serial link described above. The noise information is the BT noise in the WLAN band for different BT TX powers. The worst case is preferably assumed: WLAN is in the middle of the ISM band, BT channels are at the edges of the ISM band, thus the BT noise is the noise at 20 MHz from the BT center frequency.
2) WLAN sends channel to BT
Again this information is sent over the serial link.
3) BT enables AFH
The BT device enables AFH so that it is preferably as far from possible from the WLAN channel.
Info/Commands Per Link Exchange
4) BT sends TX/RX power+SNR per BT link to the arbitration entity Again this information is sent over the serial link. The TX power is the TX power at the antenna. The RX power is the RX power at the antenna and can be derived from the RSSI. The SNR is the SNR needed for the required BER. This can be different for different data rates, e.g. 1, 2 and 3 Mbps BT links.
5) the arbitration entity builds curves per BT link (also based on knowledge of WLAN noise/power/SNR)
These can include
   WLAN TX limit for BT RX
   WLAN TX limit for BT TX
   WLAN RX limit
   BT TX limit for WLAN RX
   BT TX limit for WLAN TX
   BT RX limit.
6) the arbitration entity sends power commands per BT link to BT
If it turns out that the 4 points (WLAN RX/BT TX, WLAN RX/BT TX, WLAN TX/BT TX, WLAN RX/BT RX) do not fall in the AFH limits, the arbitration entity can ask the BT device to adjust the power to move the points to within the AFH limits. When BT indeed adjusts its power, then it should resend the TX/RX power to the arbitration entity.
PTA Requests
7) BT does PTA request per link
When BT wants to RX or TX it does a PTA request to the arbitration entity, indicating whether it is TX or RX, indicating for which link this PTA request is, and also indicating whether it is a request with priority or not.
8) the arbitration entity grants or not
The arbitration entity grants or not the BT PTA request based on the link information, and based on the AFH curves.
The arbitration entity knows which of the 4 points is currently applicable and also for the next BT slots, whether another point becomes applicable. If the point(s) fall in the AFH region, the PTA request is granted.
  IF the point(s) do not fall in the AFH region, the arbitration as it was used in the previous version of the PTA can be applied.
Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:
1. A first wireless transceiver apparatus for operating in a part of a Radio Frequency (RF) spectrum which is shared with a co-located second wireless transceiver apparatus, the first wireless transceiver apparatus comprising:
  a wireless transceiver unit adapted to support a plurality of different wireless links, at least one of the plurality of different wireless links having a link identifier;
  an arbitration interface having a plurality of interface lines and adapted to interface with an arbitration entity which arbitrates access to the shared part of the RF spectrum between the first wireless transceiver apparatus and the second wireless transceiver apparatus;
  wherein the arbitration interface is adapted to signal time periods when the wireless transceiver unit is operational, or requests to be operational; and
  wherein the arbitration interface is adapted to send data to the arbitration entity during other time periods, wherein the data includes at least the link identifier of one of the plurality of different wireless links and data associated with the link identifier.

2. The wireless transceiver apparatus according to claim 1, wherein the arbitration interface operates in two arbitration interfacing modes when
interfacing with the arbitration entity which arbitrates access to the shared part of the RF spectrum between the first wireless transceiver apparatus and the second wireless transceiver apparatus; wherein in a first arbitration interfacing mode, the arbitration interface is adapted to signal time periods when the wireless transceiver unit is operational, or requests to be operational;
and wherein in a second arbitration interfacing mode, the arbitration interface is adapted to send the data to the arbitration entity during the other time periods.

3. The wireless transceiver apparatus according to claim 2 wherein the arbitration interface is further arranged to send an indication of whether the transceiver requests a transmission or reception operation to the arbitration entity in the first arbitration interfacing mode.

4. The wireless transceiver apparatus according to claim 2 wherein the arbitration interface is further adapted to receive data from the arbitration entity in the second arbitration interfacing mode.

5. The wireless transceiver apparatus according to claim 1 wherein the arbitration interface is arranged to send a link identifier of one of the wireless links to the arbitration entity when the wireless transceiver unit requests to be operational.

6. The wireless transceiver apparatus according to claim 5 wherein the arbitration interface is arranged to send the link identifier of one of the plurality of different wireless links by outputting serial bits on a sub-set of the lines of the arbitration interface.

7. The wireless transceiver apparatus according to claim 1 wherein the data comprises at least one of: state of a wireless link; packet type sent over a wireless link; power; SNR; Frequency Hopping Scheme.

8. The wireless transceiver apparatus according to claim 1 wherein the arbitration interface uses a first interface line to signal that the wireless transceiver unit is operational, or requests to be operational, and wherein the arbitration interface is used to send data to the arbitration entity during periods when the first line indicates that the wireless transceiver unit is not operational, or not requesting to be operational.

9. The wireless transceiver apparatus according to claim 1 wherein a sub-set of the lines of the arbitration interface are used to implement a serial interface for sending the data when the wireless transceiver unit is not operational, or not requesting to be operational.

10. The wireless transceiver apparatus according to claim 9 wherein one of the sub-sets of lines of the arbitration interface is used as a serial clock line, and another of the sub-set of lines of the arbitration interface is used as a serial data line.

11. The wireless transceiver apparatus according to claim 9, wherein one of the sub-set of lines of the arbitration interface is used both: (i) to request a transfer of data from the second wireless transceiver apparatus; and (ii) to acknowledge a data transfer.

12. The wireless transceiver apparatus according to claim 1 wherein the arbitration interface is further adapted to receive data from the arbitration entity during time periods when the wireless transceiver unit is not operational, or not requesting to be operational.

13. An arbitration entity for arbitrating access to Radio Frequency (RF) spectrum which is shared between a first wireless transceiver apparatus adapted to support a plurality of different wireless links, at least one of the plurality of different wireless links having a link identifier, and a second wireless transceiver apparatus which is co-located with the first wireless transceiver apparatus, the arbitration entity comprising:
   a first arbitration interface adapted to interface with the first wireless transceiver apparatus;
   wherein the arbitration interface is adapted to receive a signal indicating time periods when a wireless transceiver unit of one of the wireless transceivers is operational, or requests to be operational, and wherein the arbitration interface is adapted to receive data from the first wireless transceiver apparatus during other time periods, wherein the data includes at least a link identifier of one of the plurality of different wireless links and data associated with the link identifier.

14. The arbitration entity according to claim 13, wherein the first arbitration interface operates in two arbitration interfacing modes for interfacing with the first wireless transceiver apparatus; wherein in a first arbitration interfacing mode, the first arbitration interface is adapted to receive a signal indicating time periods when the wireless transceiver unit is operational, or requests to be operational; and wherein in a second arbitration interfacing mode, the first arbitration interface is adapted to receive data from the first wireless transceiver apparatus during other time periods.

15. The arbitration entity according to claim 14 wherein the arbitration interface is further adapted to send data to the first wireless transceiver apparatus in the second arbitration interfacing mode.

16. The arbitration entity according to claim 14 wherein the arbitration entity is arranged to receive an indication of whether the first wireless transceiver apparatus requests a transmission or reception operation in the first arbitration interfacing mode.

17. The arbitration entity according to claim 13 wherein the arbitration entity is arranged to store the data and to use the data to arbitrate requests for accessing the shared RF spectrum.

18. The arbitration entity according to claim 17 which is arranged to receive a link identifier of one of the wireless links when the wireless transceiver unit is requesting to be operational.

19. The arbitration entity according to claim 17 wherein the arbitration entity is arranged to store the data in a lookup table indexed by the wireless link identifiers.

20. The arbitration entity according to claim 13 further comprising a second arbitration interface adapted to interface with the second wireless transceiver apparatus for operating in a part of the RF spectrum which is shared with the first wireless transceiver apparatus.

21. The arbitration entity according to claim 20, further comprising first interference reducing means such that that communications according to a first protocol used with the first wireless transceiver apparatus are kept separate in frequency from communications according to a second protocol used with the second wireless transceiver apparatus and a second interference reducing means that provides a separation in time between communications according to the first protocol and communications according to the second protocol.

22. The arbitration entity according to claim 21, wherein the first interference reducing means comprises Adaptive Frequency Hopping (AFH) and the second interference reducing means comprises Packet Traffic Arbitration (PTA).

23. The arbitration entity according to claim 13 wherein the first wireless transceiver apparatus is a Wireless Personal Area Network (WPAN) apparatus.

24. The arbitration entity according to claim 20 wherein the second wireless transceiver apparatus is a Wireless Local Area Network (WLAN) apparatus.

25. The arbitration entity according to claim 23 wherein the first wireless transceiver apparatus is an IEEE 802.15.1 (Bluetooth™) apparatus.

26. The arbitration entity according to claim 13 wherein the arbitration interface is further adapted to send data to the first wireless transceiver apparatus during time periods when the first wireless transceiver apparatus is not operational, or not requesting to be operational.

27. A method of interfacing a first wireless transceiver apparatus adapted to support a plurality of different wireless links, at least one of the plurality of different wireless links having a link identifier, in a part of a Radio Frequency (RF) spectrum which is shared with a co-located second wireless transceiver apparatus, to an arbitration entity which arbitrates access to the shared part of the RF spectrum between the first wireless transceiver apparatus and the second wireless transceiver apparatus, the method comprising:
   operating an arbitration interface in the first wireless transceiver apparatus in a first mode to signal to the arbitration entity time periods when a wireless transceiver unit of the first wireless transceiver apparatus is operational, or requests to be operational; and
   operating the arbitration interface in a second mode to send data to the arbitration entity during other time periods, wherein the data includes at least the link identifier of one of the plurality of different wireless links and data associated with the link identifier.

28. The method according to claim 27 further comprising operating the arbitration interface in the second mode to receive data from the arbitration entity during time periods other than when a wireless transceiver unit is operational, or requests to be operational.

29. A method of interfacing an arbitration entity to a first wireless transceiver apparatus adapted to support a plurality of different wireless links, at least one of the plurality of different wireless links having a link identifier, and a second wireless transceiver apparatus which is co-located with the first wireless transceiver apparatus, the method comprising:
   receiving signaling over an arbitration interface in a first mode during time periods when a wireless transceiver unit of the first wireless transceiver apparatus is operational, or requests to be operational; and
   receiving data from the first wireless transceiver apparatus in a second mode during other time periods, wherein the data includes at least the link identifier of one of the plurality of different wireless links and data associated with the link identifier.

30. The method according to claim 29 further comprising storing the data and using the data to arbitrate requests for accessing the shared RF spectrum.

31. The method according to claim 29 further comprising sending data to the first wireless transceiver apparatus in the second mode.

32. A first wireless transceiver apparatus for operating in a part of a Radio Frequency (RF) spectrum which is shared with a co-located second wireless transceiver apparatus, the first wireless transceiver apparatus comprising:
- a wireless transceiver unit adapted to support a plurality of different wireless links;
- an arbitration interface adapted to interface with an arbitration entity which arbitrates access to the shared part of the RF spectrum between the first wireless transceiver apparatus and the second wireless transceiver apparatus;
- wherein the first wireless transceiver apparatus is arranged to signal over the arbitration interface to request access to the shared RF spectrum and is further arranged to send a link identifier of the wireless link for which the request is being made while the access request is asserted.

33. The wireless transceiver apparatus according to claim 32,
- wherein the arbitration interface operates in two arbitration interfacing modes to interface with an arbitration entity which arbitrates access to the shared part of the RF spectrum between the first wireless transceiver apparatus and the second wireless transceiver apparatus;
- wherein in a first arbitration interfacing mode the arbitration interface is adapted to signal time periods when the wireless transceiver unit is operational, or requests to be operational; and
- wherein in a second arbitration interfacing mode the arbitration interface is adapted to send data to the arbitration entity during other time periods.

34. A method, by an arbitration entity, of mitigating interference between first and second co-located wireless transceiver apparatuses, each transceiver apparatus operating in a same Radio Frequency (RF) spectrum, at least the first transceiver apparatus maintaining a plurality of wireless links and operative in a first mode in which it signals to the arbitration entity time periods when the first wireless transceiver unit is operational, or requests to be operational, and a second mode in which it sends data to the arbitration entity during other time periods, wherein each transceiver apparatus is coupled to the arbitration entity via a respective arbitration bus, the method comprising:
- receiving from the first transceiver apparatus, on the first arbitration bus operating in the second mode, serial data including information relevant to the operation of the first transceiver apparatus, wherein at least some data is associated with a particular link identifier;
- storing data in a look-up table indexed by link identifiers;
- receiving from the second transceiver apparatus, on the second arbitration bus, a request to be operational;
- receiving from the first transceiver apparatus, on the first arbitration bus operating in the first mode, a request to be operational to service a particular link, and further receiving a link identifier;
- indexing the look-up table with the received link identifier and retrieving data associated with the link identifier; and
- based on the retrieved data, making an arbitration decision between the first and second transceiver apparatuses being operational.

35. The method according to claim 34, further comprising receiving from the first transceiver apparatus, on the first arbitration bus during the first mode of operation, an indication whether the first transceiver apparatus requests a transmit or receive operation.

36. The method according to claim 35, further comprising, in response to the retrieved data and transmit/receive indication, employing one of first and second interference reducing means, wherein:
- a first interference reducing means comprises determining sufficient frequency separation between the requested operations of the first and second transceiver apparatuses and allowing both to be operational simultaneously; and
- a second interference reducing means comprises determining insufficient frequency separation between the requested operations of the first and second transceiver apparatuses and temporally separating the first and second transceiver operations.

* * * * *